United States Patent
Stabrey

(10) Patent No.: US 8,260,503 B2
(45) Date of Patent: Sep. 4, 2012

(54) METHOD AND DEVICE FOR ACTUATING AN ACTIVE AND/OR PASSIVE SAFETY SYSTEM IN A MOTOR VEHICLE

(75) Inventor: Stephan Stabrey, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 551 days.

(21) Appl. No.: 12/501,965

(22) Filed: Jul. 13, 2009

(65) Prior Publication Data

US 2010/0023224 A1   Jan. 28, 2010

(30) Foreign Application Priority Data

Jul. 25, 2008   (DE) .......................... 10 2008 040 713

(51) Int. Cl.
*B60R 22/00* (2006.01)

(52) U.S. Cl. ............ 701/45; 701/46; 340/435; 340/436; 180/197

(58) Field of Classification Search ................... 701/45, 701/46; 340/435, 436, 438; 180/170, 197
See application file for complete search history.

(56) References Cited

U.S. PATENT DOCUMENTS

| 6,113,138 A | 9/2000 | Hermann et al. |
| 6,363,306 B1 | 3/2002 | Palmertz et al. |
| 2002/0183962 A1 | 12/2002 | Glaser et al. |
| 2008/0284574 A1* | 11/2008 | Bosch ........................... 340/438 |

FOREIGN PATENT DOCUMENTS

WO  WO 2005/065997   7/2005

* cited by examiner

*Primary Examiner* — Gertrude Arthur Jeanglaude
(74) *Attorney, Agent, or Firm* — Kenyon & Kenyon LLP

(57) ABSTRACT

A method and device for actuating an active and/or passive motor vehicle safety system in a driving situation in which the vehicle executes a rotary movement about the vertical axis of the vehicle. A variable describing the rotary motion is measured, and this variable is processed by a mathematical model, which determines information therefrom about the future rotary motion of the vehicle. This information in turn may be used to control the vehicle safety systems as a function of the situation and prepare them for a possibly imminent collision.

12 Claims, 2 Drawing Sheets

METHOD AND DEVICE FOR ACTUATING AN ACTIVE AND/OR PASSIVE SAFETY SYSTEM IN A MOTOR VEHICLE

BACKGROUND INFORMATION

These days, motor vehicles have a multitude of active and passive safety systems for avoiding accidents or for mitigating their effects. Among such systems are, in particular, electronic stability programs ESP, different types of driver-assistance systems such as ACC or Lane Keeping Support LKS, as well as airbag and other restraining systems.

The active safety systems known from the related art usually intervene in the driving if particular trigger criteria are met, e.g., if the vehicle is oversteering or understeering. The mentioned actuating interventions are meant to support the driver in stabilizing the vehicle or in very quickly resuming control again in critical situations.

Current electronic stability programs determine the type and magnitude of the control interventions on the basis of the instantaneous moving state of the vehicle. In so doing, the deviation of measurable motion variables such as the yaw rate, for instance, from a setpoint value that represents the driver-desired direction is evaluated. In the case of an ESP, if the deviation exceeds particular limit values an attempt is made to reduce this deviation by wheel-specific braking interventions.

However, if the vehicle is no longer able to be stabilized at all within the framework of the physical driving limits, then such interventions may also have the effect that the vehicle remains longer than necessary in a moving state, in particular in the transverse direction, that is critical for the passengers. For instance, a situation may arise in which the rotary motion of the vehicle is actually arrested by the electronic stability program, but the vehicle continues to slide in the transverse direction. Without the intervention of the dynamic stability control, the vehicle would have rotated further about the vertical axis and then would have rolled backwards further, for instance. For the passengers this situation would be considerably less risky than the transverse sliding of the vehicle with the risk of a side impact. Knowledge of the future rotational behavior (possibly assuming a particular stabilizing intervention) is therefore important for a further improvement in the passenger protection.

SUMMARY OF THE INVENTION

Therefore, it is an object of the present invention to provide a method as well as a device with whose aid the future rotary motion of the vehicle in an uncontrollable driving situation is able to be predicted.

An important aspect of the present invention is to measure a variable that describes the yawing motion or the rotary motion of the vehicle and to feed this variable into a mathematical model, which—assuming specific physical conditions and, optimally, also a particular intervention of a vehicle stability program—then uses it to determine information about the future rotary movement of the vehicle. This information is finally utilized to operate at least one vehicle safety system as a function of the situation. For example, if the model-based estimation of the future rotary movement indicates that the vehicle would slide transversely over a longer period of time, notwithstanding the full intervention of the vehicle stability program, then the actuating intervention of the vehicle stability program may be reduced to such an extent, for example, that the vehicle rotates more than 90° and the rotation comes to a stop at 180°, for instance. This results in a considerably lower risk of a critical side impact for the passengers. Independently of a modification of the intervention strategy of the electronic stability program, other vehicle safety systems, in particular passive system types, e.g., passenger restraining systems, airbag systems, or an active side impact protection, are also able to be activated in a timely manner or be prepared for imminent deployment.

The mathematical model according to the present invention is preferably designed such that it is able to predict the future course of a sideslip angle or yaw angle, a maximum angle, a time period until a maximum angle is reached, an angular acceleration, and/or another characteristic variable that describes the future rotary motion of the vehicle. Especially the future course of the sideslip or yaw angle or its maximum angle provides information as to whether in the future the vehicle is going to be in a driving state in which it slides transversely to the center of mass trajectory.

The measured values of the instantaneous or previous yaw rate, the sideslip angle or other variables that describe the rotary motion of the vehicles may be utilized as input variables for the mathematical model. These variables are measured, preferably with the aid of appropriate sensors, or estimated by suitable algorithms.

According to one preferred specific embodiment of the present invention, the current yaw rate of the vehicle is measured and processed by the mathematical model. The yaw rate is preferably measured by a yaw rate sensor, which is installed in most vehicles anyway. The use of the yaw rate as an input variable therefore has the advantage of being available in the vehicle in a simple and cost-effective way.

The mathematical model preferably considers the friction conditions between wheels and roadway and also the intervention of at least one stabilizing system, such as the ESP. According to one preferred specific embodiment of the present invention, the mathematical model determines the information pertaining to the future rotary motion of the vehicle assuming a maximum intervention of a stabilizing system, for instance a maximum braking intervention of the ESP.

To calculate the desired information, the mathematical model preferably includes a function that reproduces the lessening of a rotational movement that has occurred. According to a preferred specific development of the present invention, this function is realized in the form of a parabolic function. Other mathematical descriptions that approximate the rotational behavior as precisely as possible are likewise conceivable.

The algorithm described above may basically be stored in any control device of the vehicle. Preferably, however, the mathematical model is integrated in the control device of the electronic stability control.

DETAILED DESCRIPTION

Figure 1:
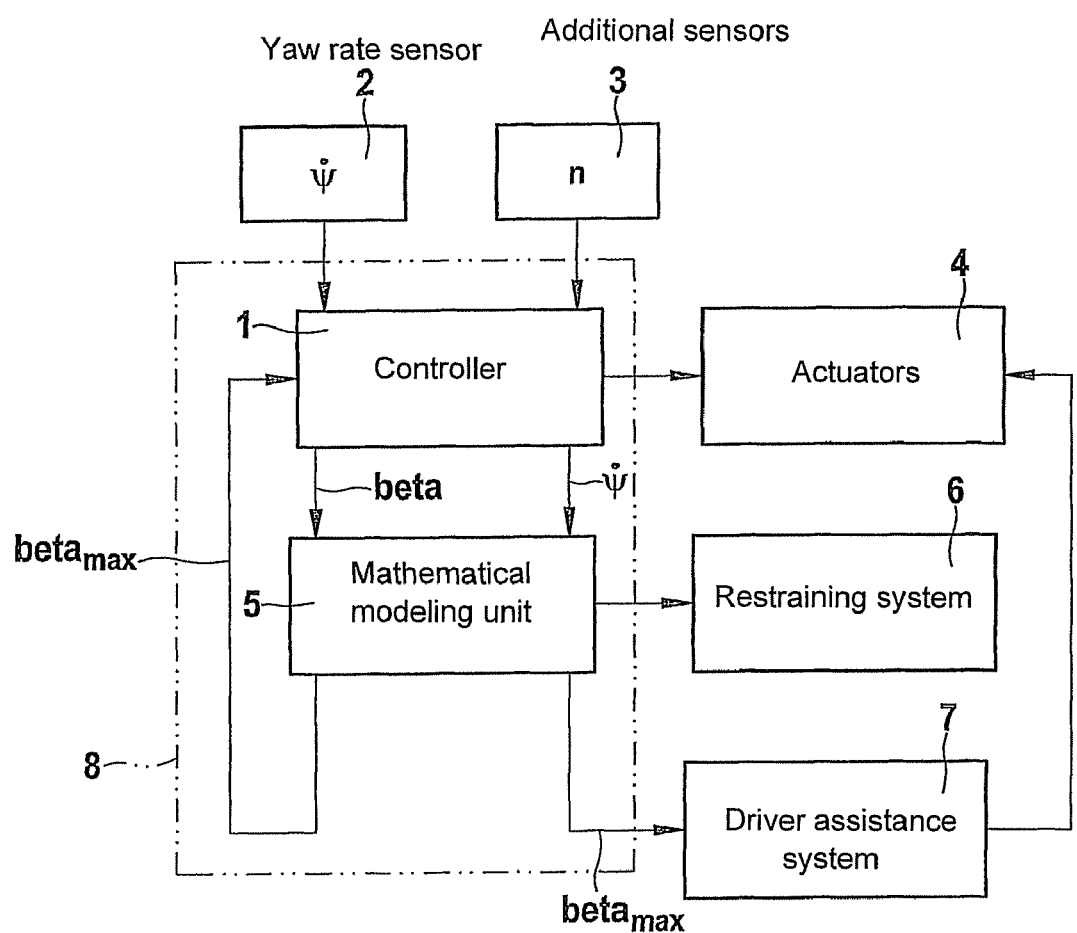
FIG. 1 shows a schematic illustration of a system for actuating active or passive vehicle safety systems while taking the estimated future rotary movements of the vehicle into account.

FIG. 1 shows a schematic block diagram of different vehicle safety systems, which are operated taking an estimated future rotary movement of the vehicle into account. The system includes an electronic stability control 1, which is able to intervene in the driving operation via one or more actuators such as the vehicle brakes, for instance, in order to stabilize the vehicle. The associated actuators of electronic stability control 1 are combined here in a block 4. The instantaneous driving situation is monitored with the aid of sensors 2 and 3. As a rule, these are specifically a yaw rate sensor 2 and additional sensors, e.g., wheel-speed sensors, steering-angle sensors and transverse acceleration sensors, which have been subsumed under number 3 in the figure. Further sensors may be provided in addition, depending on the system.

Controller 1 estimates sideslip angle β of the vehicle in the known manner and forwards this value and also the value of the instantaneous yaw rate dpsi/dt to a unit 5, which includes a mathematical model that estimates information about the future rotary movement of the vehicle therefrom. The sideslip angle prognosis in this case is based on a change in the yaw angle, which is predicted on the basis of the measured yaw rate. In the exemplary embodiment shown, the information estimated by unit 5 is a maximum sideslip angle $\beta_{max}$, but it may also be any other item of information such as the course of the future rotary movement, for instance.

The model included in unit 5 determines the future rotary movement while taking specific physical situations into account, especially the friction situation between tire and road, and preferably also assuming a specific intervention of vehicle control 1. For the abating of a rotary movement (taking the mentioned variables into account), a parabolic function, for instance, may be used, which approximates the course of the yaw rate relatively well. In this case the following applies for yaw rate dpsi/dt:

$$dpsi/dt = a_1 \cdot t^2 + a_2 \cdot t + a_3, \quad (1)$$

$a_1, a_2$ and $a_3$ being parameters and t being the time. Preferably used as start value $a_3$ is the instantaneous measured value of yaw rate dpsi/dt. Consequently:

$$dpsi/dt(t=0) = a_3 = dpsi_0/dt.$$

Yaw angle psi results from a time integration of yaw rate (1) as:

$$psi(t) = int(dpsi/dt)dt + psi_0 = \frac{1}{3} \cdot a_1 \cdot t^3 + \frac{1}{2} a_2 \cdot t^2 + a_3 \cdot t + psi_0 \quad (2)$$

For the method it is assumed that ≈−psi is true for sideslip angle β, i.e., that the sideslip angle thus roughly corresponds to the yaw angle in its amount. Thus, it is preferred to use the instantaneous negative measured or estimated value of sideslip angle $-\beta_0$ for the start value $psi_0$ of the yaw angle. As a consequence, the following applies:

$$psi_0 = -\beta_0.$$

For the yawing acceleration $d^2psi/dt^2$, the following applies:

$$d^2psi/dt^2 = 2 \cdot a_1 \cdot t + a_2. \quad (3)$$

The yawing acceleration may be estimated, for instance, from the tire forces and via the moment equilibrium $d^2psi/dt^2 = Mz/J$, Mz being the highest yawing moment $Mz_{max}(\beta_0)$ achievable by brake and steering interventions as a function of the sideslip angle, and J being the mass moment of inertia. Thus, the following holds for coefficient $a_2$ in equation (1):

$$d^2psi/dt^2(t=0) = a_2 = Mz_{max}(\beta_0).$$

In the course of the driving maneuver the estimation of the maximum sideslip angle is able to be improved by determining the instantaneous yawing acceleration on the basis of the measured yaw rate values.

Thus, only parameter $a_1$ is still undetermined in equation (1). One possibility for establishing parameter $a_1$ consists of determining it as a multiple of $a_2$. Thus, for instance, $$a_1 = -a_2 \cdot 0.85$$

may be specified. Instead of exemplary value 0.85, it is also possible to specify a different value. This takes into account that the yawing moment able to be produced by electronic stability control 1 is greater at the beginning of a critical driving situation, in which the sideslip angle is small, than at greater sideslip angles, in which braking and also steering interventions no longer have more than a very negligible effect on the yawing motion.

Therefore, all coefficients from equation (1) are determined. The maximum sideslip angle is reached once the yaw rate has become zero, i.e., when the following applies:

$$dpsi/dt = 0.$$

For the instant at which the maximum sideslip angle occurs, two solutions are obtained from equation (1):

$$t_{end1} = \frac{1}{2}/a_1 \cdot (-a_2 - (a^2 - 4 \cdot a_1 \cdot a_3)^{1/2}) \quad (4a)$$

$$t_{end2} = \frac{1}{2}/a_1 \cdot (-a_2 + (a^2 - 4 \cdot a_1 \cdot a_3)^{1/2}) \quad (4b)$$

Finally, maximum yaw angle $psi_{end}$ results from equation 2 for $t = t_{end}$.

$$psi_{end} = \frac{1}{3} \cdot a_1 \cdot t_{end}^3 + \frac{1}{2} \cdot a_2 \cdot t_{end}^2 + a_3 \cdot t_{end} - \beta_0,$$

and from this, the missing maximum sideslip angle $\beta_{max}$ as:

$$\beta_{max} = -psi_{end}.$$

Maximum sideslip angle $\beta_{max}$ calculated in this manner is then able to be supplied to the electronic stability control, for instance, in order to control it as a function of the situation. For example, if the model-based estimation of the future rotary movement indicates that the vehicle would slide transversely for a longer period of time even with a full intervention of the vehicle stability program, then the actuating intervention of the vehicle stability program may be reduced to such an extent, for example, that the vehicle rotates further than 90° and the rotation comes to a stop at 180°, for instance. This results in a considerably lower risk of a critical side impact for the passengers.

Knowledge of maximum sideslip angle $\beta_{max}$ may also be used to prepare a restraining system 6 for a potential collision. As an alternative, a driver assistance system 7 may also initiate emergency braking.

Figure 2A:
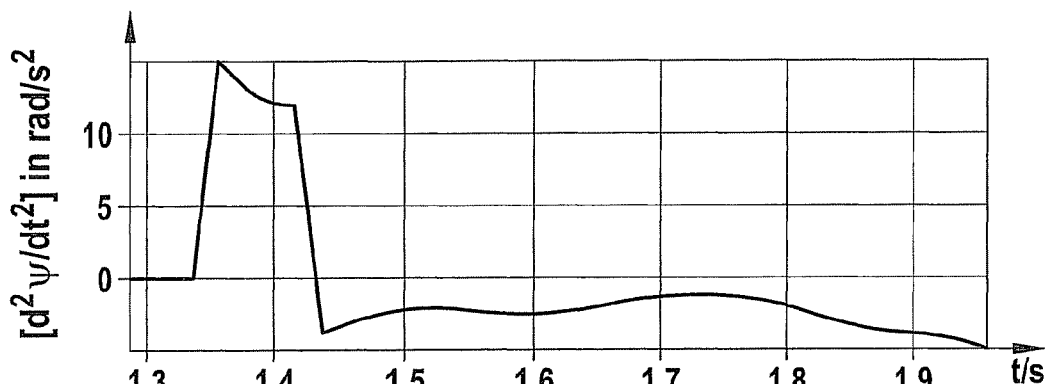
FIGS. 2a, 2b and 2c show the course of the yawing acceleration (FIG. 2a), the yaw rate (FIG. 2b), and the yaw angle (FIG. 2c) during a driving situation in which the vehicle is rotating about the vertical axis.

FIG. 2a shows the curve of the yawing acceleration of a vehicle for which a side collision has occurred at the tail end and which therefore executes a rotary movement about the vertical axis of the vehicle. As can be gathered, the yawing acceleration as a result of the side collision first assumes a large positive value, so that the yaw rate in FIG. 2b rises rapidly. If the collision has come to an end, the yawing acceleration becomes negative due to friction and the intervention of electronic stability control 1, and the yaw rate decreases again.

Figure 2B:
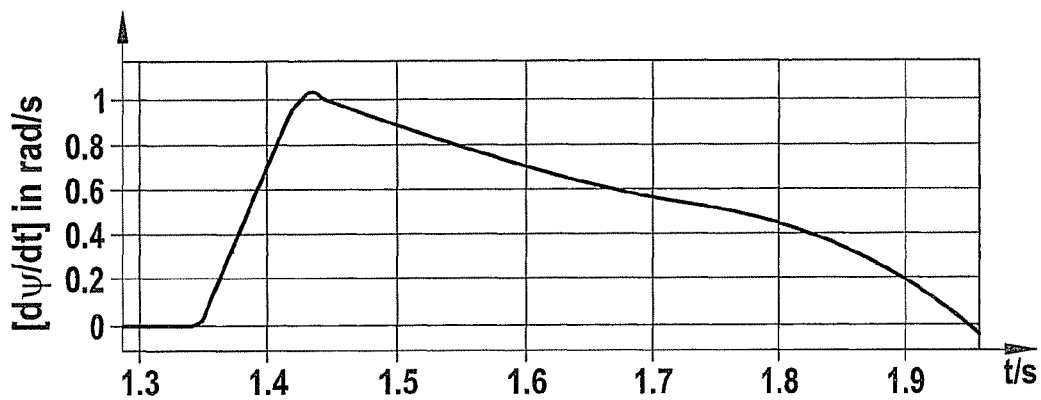

FIG. 2b shows the curve of the associated yaw rate of the vehicle. As can be seen, it increases until a maximum has been reached after approximately 1.45 s. Then, yaw rate dpsi/dt decreases continuously, that is to say, the rotary movement slows.

Figure 2C:
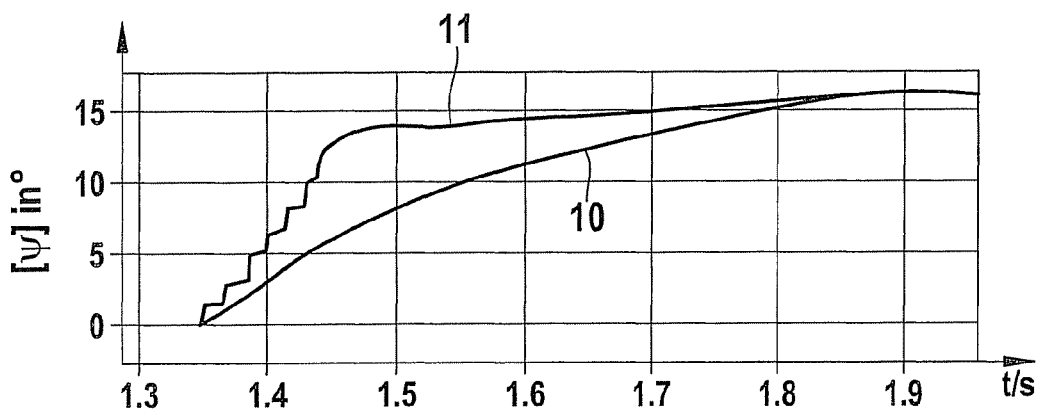

FIG. 2c shows the curve of yaw angle 10 and simulation result 11 of the yaw angle prediction. As can be gathered, maximum yaw angle $\Psi_{max}$ to be expected is able to be predicted very well starting already at the instant at which maximum yaw velocity dpsi/dt has been reached. It roughly corresponds to negative maximum sideslip angle $\beta_{max}$, as explained above. As a consequence, vehicle control systems and/or restraining systems are already able to be adjusted according to the situation in a very timely manner.

What is claimed is:

1. A method for actuating at least one active and/or passive safety system of a vehicle in a driving situation in which the vehicle executes a rotary movement about a vertical axis of the vehicle, the method comprising:
   measuring a variable describing a rotary motion of the vehicle;
   processing the variable by a mathematical model which (i) determines at least one item of information about a future rotary motion of the vehicle, and (ii) includes an assumption that at least one vehicle stabilizing system will apply a maximum intervention to limit the future rotary motion;
   responsive to determining that the vehicle will slide transversely over a period of time notwithstanding the maximum intervention of the at least one vehicle stabilizing system, reducing an actual amount of intervention applied by the at least one vehicle stabilizing system; and
   actuating at least one vehicle safety system as a function of the determined information.

2. The method according to claim 1, wherein the mathematical model determines a future course of a sideslip or yaw angle, a maximum sideslip or yaw angle of the vehicle, a time period until a maximum sideslip or yaw angle is reached, an angular acceleration or other characteristic variable that describes the future rotary motion of the vehicle.

3. The method according to claim 1, wherein at least one of an instantaneous yaw rate, a sideslip angle or other variable describing the rotary motion of the vehicle is measured and processed by the mathematical model.

4. The method according to claim 1, wherein the mathematical model includes assumptions regarding a delay of the rotary motion by friction.

5. The method according to claim 1, wherein the mathematical model includes a parabolic function, which describes a future rotary behavior of the vehicle.

6. The method according to claim 1, further comprising using the information determined by the mathematical model to control or regulate the safety system as a function of the information.

7. The method of claim 2, further comprising:
   calculating a future time instant at which the yaw rate is zero;
   calculating the maximum yaw angle as being equal to a yaw angle that occurs when the time is equal to the future time instant; and
   calculating the maximum sideslip angle based on the maximum yaw angle.

8. The method of claim 7, wherein the maximum sideslip angle is calculated by negating the maximum yaw angle.

9. A control device for actuating at least one active and/or passive safety system of a vehicle in a driving situation in which the vehicle executes a rotary movement about a vertical axis of the vehicle, the control device comprising:
   means for measuring a variable describing a rotary motion of the vehicle;
   means for processing the variable by a mathematical model, which determines at least one item of information about a future rotary motion of the vehicle, and which includes an assumption that at least one vehicle stabilizing system will apply a maximum intervention to limit the future rotary motion;
   means for, in response to determining that the vehicle will slide transversely over a period of time notwithstanding the maximum intervention of the at least one vehicle stabilizing system, reducing an actual amount of intervention applied by the at least one vehicle stabilizing system; and
   means for actuating at least one vehicle safety system as a function of the determined information.

10. The control device according to claim 9, wherein the control device is connected to a yaw rate sensor or other sensor, which measures the variable describing the rotary motion of the vehicle.

11. The control device according to claim 9, wherein the control device is part of a vehicle safety system, including at least one of a restraining system, an airbag system, the at least one vehicle stabilizing system and a brake system.

12. The method of claim 11, wherein the at least one vehicle stabilizing system is an electronic stability system that initiates wheel-braking interventions based on the measured variable.

* * * * *